United States Patent [19]

Lemmrich

[11] 4,007,363
[45] Feb. 8, 1977

[54] ELECTRIC CONTROL DEVICE USING FREQUENCY-ANALOG CONTROL

[75] Inventor: Jürgen Lemmrich, Hamburg, Germany

[73] Assignee: U.S. Philips Corporation, New York, N.Y.

[22] Filed: Jan. 10, 1975

[21] Appl. No.: 540,175

[30] Foreign Application Priority Data

Jan. 30, 1974 Germany ............................ 2404255

[52] U.S. Cl. ............................................... 235/151.1
[51] Int. Cl.² ........................................ G05B 11/26
[58] Field of Search ................................ 235/150.1

[56] References Cited

UNITED STATES PATENTS 3,836,756  9/1974  Yammoto et al. ............... 235/150.1

FOREIGN PATENTS OR APPLICATIONS

1,297,366  6/1969  Germany ......................... 235/150.1

*Primary Examiner*—Eugene G. Botz
*Attorney, Agent, or Firm*—Frank R. Trifari; Bernard Franzblau

[57] ABSTRACT

The frequency-analog desired and actual-value signals are applied to a subtractor stage, which forms the difference between the frequencies of the two signals, and this difference is superimposed on a carrier frequency. The output frequency is compared with the carrier frequency in a two-bit reversible counter, whose output is a pulse-width modulated output pulse train which forms the correction signal. A proportional component can be introduced in that the difference frequency modulates the phase of the carrier pulse train before the comparison. A subordinate control loop can be formed in that the output signal of the comparison-counter applies a reference frequency to a further reversible counter, which at the input for the other direction continuously receives the frequency-analog further actual-value signal. The output signal of the further counter may then be further processed in digital or analog form. The further actual-value signal can also be converted into a pulse-width modulated signal, which can directly be compared with the other signal.

25 Claims, 7 Drawing Figures

Fig. 7 ns in a far more favourable man-
ELECTRIC CONTROL DEVICE USING FREQUENCY-ANALOG CONTROL The invention relates to an electrical control device for deriving a correction signal from a frequency-analog actual-value signal and a frequency-analog desired-value signal.

In such a control device the actual-value signal, which is generally taken from the output of the controlled system and which, for example, represents a temperature, is compared with a desired value signal and from the difference a correction signal is derived, which for example readjusts a heating device so that the temperature approximates the desired value.

For measuring and transmitting the actual value from the output of the controlled system, different methods may be used. It has been found that the frequency-analogue representation of measuring values is very well suited for measuring-value transmission because the physical distance between the controlled system, which may for example be a chemical process, and the electrical control device may be very large, so that the transmission line is highly susceptible of picking up interference. In the case of frequency-analogue transmission of the measuring values such interference can be eliminated in a comparatively easy manner.

Electrical control devices which derive an analog correction signal from an analog actual value and desired value are generally known. However, such control devices are not readily capable of processing frequency-analog signals, but said signals must first be converted into continuous analog signals. This would give rise to both a loss of accuracy and additional cost. Hence, it is more effective to employ digital control methods whenever possible.

In the Electrotechnischen Zeitschrift, Part B, Volume 24, (1972) number 13, pages 328 to 330, a device is described which employs the direct comparison of pulses of the actual-value and desired-value signals with respect to succession in pairs. Missing or excess pulses are evaluated as control errors which are stored in a counter so as to form the integrating component. To form the proportional component output pulses of adjustable length are produced. The two signal components are added in an analog manner so that the output signal is also available as an analog, quasi-continuous signal.

A drawback of said device is, inter alia, the comparatively high quantization, which is caused by the fact that only complete pulses are evaluated as an error, and the control circuit being influenced by the setpoint. Moreover, owing to the required basic cost, it is not suited for controlling separate quantities.

From German Patent Specification 1,297,366, a brief description of which can be found in U.S. Pat. No. 3,534,336 (FIGS. 1 and 2), a control arrangement is known which also processes the frequency-analog actual-value signal directly without analog conversion. However, the desired value is then formed by setting a decoding circuit for a counter to the value at which the corresponding count yields an output signal. Said known control arrangement has also been designed mainly for a most favourable use in proportional control systems and it requires a bulky counter and is of an intricate construction. Furthermore, the two known control arrangements present problems in respect to the formation of the P-component and the combination thereof with the I-component into the resulting controller output signal. This also results in their output signals being quasi-analog, although many correction elements (e.g. power amplifiers) are capable of directly processing the switching signals in a far more favourable manner.

It is an object of the invention to provide an electronic control device for the direct processing of frequency-analog signals, which device is suited for substantially universal use and which can readily be adapted to the conditions of use, and which is moreover of a simple design. The invention solves said problem in that a subtractor stage receives the frequency-analog actual-value signal and the desired-value signal and produces a differential pulse train with a frequency which equals the difference between the frequencies of the actual-value signal and of the desired-value signal. An adder stage adds the differential pulse train to a carrier pulse train and supplies an output train whose frequency equals the sum of the frequencies of the two pulse trains. A 2-bit reversible counter with an overflow inhibition feature receives at the counting input for the one counting direction the output pulse train, and at the counting input for the other counting direction it receives the carrier pulse train. The output of the second counter stage supplies a control signal in pulse-width modulated form for the formation of the correction signal. The control signal can readily be converted into an analog correction signal in accordance with one of the many known methods. In the case of the solution according to the invention, a low-pass filter may readily be employed because the frequency of the control signal only depends upon the frequency of the carrier pulse train and not on the set-point or the control error. This is also a substantial advantage with respect to the known devices.

The invention is consequently based on the principle of comparison of the phase of the actual-value and the desired-value pulses. Such a phase comparison generally yields the integral of the frequency control error so that said principle may readily be used for all controlled quantities which can be represented as frequencies or which are to be controlled integrally. By the superposition of a carrier frequency on the difference frequency of the actual and the desired-value signal and by comparison of the resulting frequency with the actual carrier frequency, a pulse-width modulated signal is obtained, whose sampling rate corresponds to the carrier frequency and whose pulse width only depends on the control error. Hence, the carrier pulse train is suitably generated by a variable oscillator so as to obtain optimum adaptation of the frequency of the carrier pulse train to the specific conditions.

A further problem may occur when the sampling rate varies substantially in dependence on the controlled quantity, which is represented as a frequency, so that at zero measuring value the sampling frequency is also zero. In an embodiment of the invention this can be avoided in that the actual-value signal and the desired-value signal have the same finite frequency at zero signal value.

The formation of the difference between the desired-value signal and the actual-value signal as well as the addition of the carrier pulse train may also be combined in a superposition stage which generates the output pulse train by pulse interpolation, for which various circuits are known. However, the output pulse train thus obtained is not equidistant, so that it is effective to connect a pulse reducer in series, which improves the pulse spacing in accordance with the dividing factor. A frequency divider with the same dividing factor must then also be provided for the carrier pulse train. The circuit arrangement according to the invention can readily be extended so as to provide a proportional component by passing the carrier pulse train, prior to the phase comparison in the counter, through a controllable pulse driving stage which modulates the carrier pulse train in phase in accordance with the control error, i.e. the difference between the desired-value signal and the actual-value signal. Said pulse driving stage may be a monostable multivibrator whose pulse time can be controlled by a voltage which is derived from the difference between the frequencies of the actual-value signal and the desired-value signal by means of a frequency-voltage converter. This may be effected in different ways, for example by pulse averaging or by pulse-spacing measurement with a sampling and hold circuit. The frequency-voltage conversion factor of the converter as well as the trigger sensitivity of the pulse driving stage then determine the magnitude of the proportional component. The integrating component can be varied in that the desired-value signal and the actual-value signal are each passed through a variable frequency divider with the same dividing factor.

Certain problems arise when an electrical control device includes a subordinate control loop, whose correction signal is to be derived from the control signal, allowing for further actual-value signals at intermediate points in the control system. As the control signal is a pulse-width modulated switching signal, it proves to be impossible to suitably combine said switching signal as a desired value signal with a further actual-value signal, in particular when said signal is also frequency-analog. It is true that the problem can be solved by conversion of the pulse-width modulated switching signal into an analog signal which, in conjunction with an analog further actual-value signal, enables a subordinate control loop to be obtained, but this will be at the expense of the accuracy and will impair the system uniformity. Therefore, in a further embodiment of the invention, the electrical control device is designed so that in the case of subordinate control loops with further frequency-analog actual-value signals derived from intermediate points of the control system, a further reversible counter receives a reference pulse train at the input for the one counting direction during the duration of each pulse of the pulse-width modulated control signal of the two-bit counter stage, and continuously receives the further actual-value signal at the input for the other counting direction. At the beginning of each pulse of the control signal the content of the further reversible counter is stored and the counter is set to a selectable value. The stored counter contents produces the correction signal via a controller. The further frequency-analog actual-value signal is also suitably represented by a finite frequency at zero signal-value (life-zero component), and the selectable value to which the further counter can be reset at the beginning of each pulse of the control signal equals the product of said finite frequency and the period of the control signal, which equals the period of the carrier pulse train, which has been divided as the case may be. The counter contents may be stored in different ways, for example in a digital register to which a digital-to-analog converter may be connected whose output signal in turn is supplied to the analog controller. The counter contents, however, may also be further processed in a purely digital controller.

If the further actual-value signal is in analog form, it is possible according to another embodiment of the invention that upon each pulse of the pulse-width modulated control signal an analog converter supplies an actual-value pulse whose duration corresponds to the actual-value signal. A comparator stage compares the pulse duration of the actual-value pulses and the pulses of the control signal and supplies a pulse train in which the duration of the pulses equals the difference between the pulse durations, and said pulse train produces the correction signal via a controller. In a preferred embodiment this can be effected in that to the output of the comparator stage a sampling and hold circuit is connected, which circuit converts the pulse train appearing at said output into an analog signal and supplies it to an analog controller.

Embodiments of the invention will now be described with reference to the drawing, in which.

Figure 1:
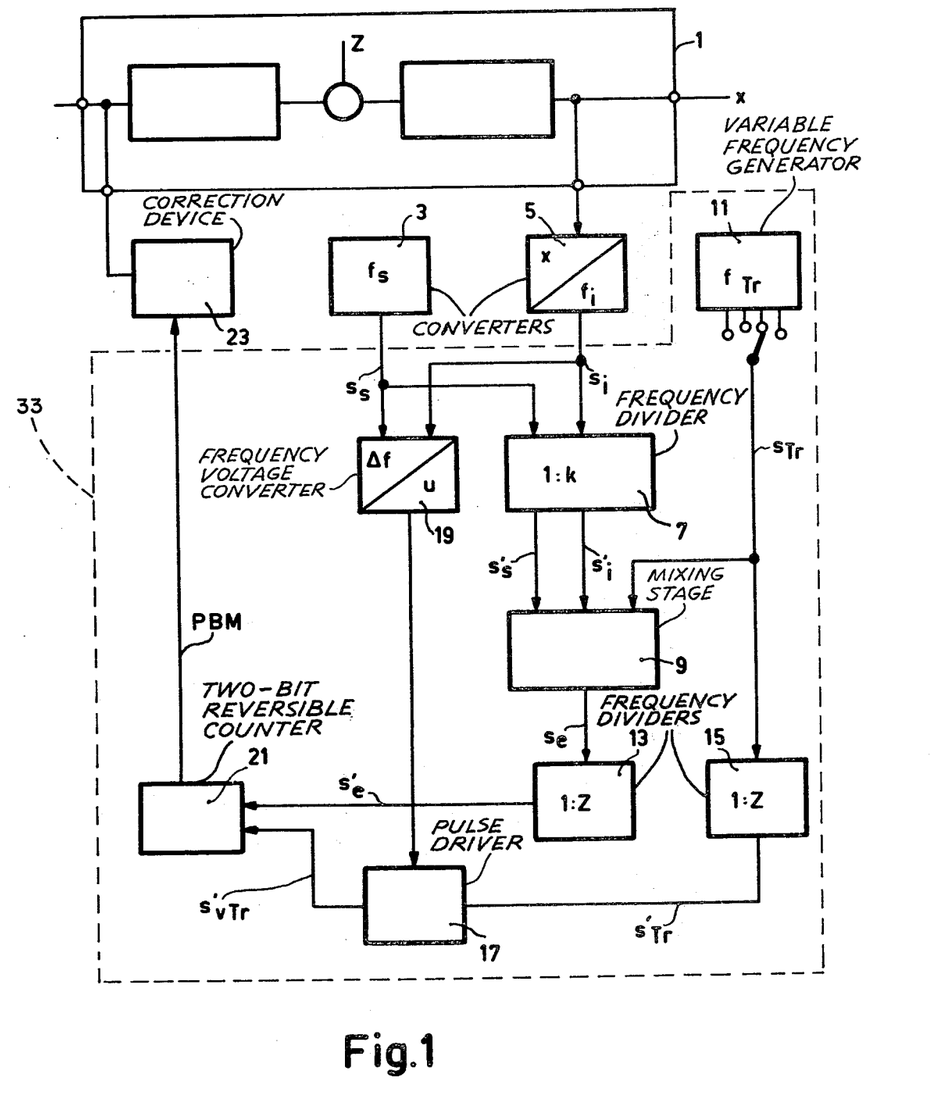
FIG. 1 shows a block diagram of a control device according to the invention for frequency-analog signals.

In FIG. 1 the process to be controlled is represented, by way of example, by a control system 1 of the second order which is disturbed by a disturbing quantity z. In the converter 3 the desired value is converted into the frequency $f_s$ of a pulse train, which represents the desired-value frequency-analog signal $s_s$, in the event that the desired value is not available in this form from the very beginning. In the converter 5 the controlled quantity is converted into the frequency $f_i$ of a pulse train, which represents the frequency-analog the actual-value signal $s_i$. Frequently, the quantity to be controlled is already available as a frequency-analog signal at the measuring point, as for example in the case of force or pressure measurements wherein a strain-gauge measuring bridge directly drives a harmonic oscillator, or when vibrating strings or springs are detuned, or in the case of flow measurements with turbine-wheel pick-ups, or the case of drive system control etc.

The two frequency-analog signals are now applied to a divider 7 which reduces the frequency of the two pulse trains by the same amount $k$, in order to determine the integrating component. The frequency divider may consist of a conventional counter such as the K 211 counter sold by the Digital Equipment Corporation of Maynard, Mass.. A plurality of bistable flip-flops connected in cascade also will serve the purpose. When the integrating component must be adjustable, the divisor $k$ of said divider 7 should be adjustable. This is preferably achieved in that the divider consists of an adjustable module, e.g. a decade, and an add-on module with a fixed setting, which serves for range selection and which is fitted by mechanical connections (soldering or plugging).

The pulse trains $s'_s$ and $s'_i$, whose frequencies have been divided, are applied to a mixing stage 9 where they are subtracted from each other and the difference is added to a carrier pulse train $s_{Tr}$. Said mixing stage should deliver an output pulse train with near-equidistant pulse distribution. As this is essentially a difficult problem, the method of pulse interpolation or pulse gating is suitably employed for the addition or subtraction. The difference in pulse spacing in the output pulse train, which when three input signals which are equidistant per se are added or subtracted in accordance with the said method is maximum two periods, relative to an output pulse train of the same frequency with equidistant pulses, is reduced by a factor $z$ by dividing the output pulse train $s_e$ by said amount $z$, so that it is hardly perceptible. Said division is effected in the frequency divider 13.

To obtain the same level for phase comparison, the carrier frequency $s_{Tr}$ should also be divided by the same amount $z$. This is effected in the frequency divider 15.

The carrier pulse train $s'_{Tr}$ whose frequency has been divided is now phase modulated in the pulse driving stage 17 for the formation of a P or PD control-component. Suitably, said pulse driver 17 is a monostable multivibrator which is periodically triggered by each pulse of the divided carrier pulse train $s'_{Tr}$, and whose pulse time is controlled by a voltage which is derived, by means of the converter 19, from the difference between the frequency $f_s$ of the desired-value signal $s_s$ and the frequency $f_i$ of the actual-value signal $s_i$. Said frequencies are comparatively high for the embodiment which is described, as is necessary for the addition and subtraction by pulse interleaving in the mixing stage 9, so that the conversion of the frequency difference into a voltage can simply be effected by pulse averaging with a low-pass filter. For example, converter 19 may comprise a control circuit similar to that shown in FIG. 2 of U.S. Pat. No. 3,408,549, wherein the pulse signals $S_s$ and $S_i$ are applied to input terminals 22 and 34 and the output voltage at terminal 40 is applied to the monostable multivibrator 17. In the case where the reversible counter supplies pulses of standard height and width, the D/A converter 38 of said patent may be replaced by a simple low pass filter comprising a series resistor and a parallel capacitor for effecting DC-averaging of the counter output pulses. When a different frequency mixing process is employed in the mixing stage 9, which requires no frequency division to improve the equidistant spacing of the output pulse train, a lower frequency level may be used. The converter 19 may then operate in accordance with the principle of pulse spacing measurement by means of a sampling and hold circuit.

When the pulse shift of the pulse driving stage 17 is proportional to the control voltage, and said voltage in its turn is proportional to the frequency difference between the actual-value signal and the desired-value signal, a pure P-component is obtained. By means of an additional differentiation, which can be realized by a simple differentiating network, PD-operation can be obtained.

The phase-modulated carrier pulse train $s'_{vTr}$, which may for example be derived from the trailing edges of the pulses from the pulse driving stage 17, and the output pulse train $s'_e$, whose frequency has been divided by the frequency divider 13, are applied to a frequency and phase comparator 21. An example of unit 21 may be found in FIG. 2 of U.S. Pat. No. 2,951,986, in particular Flip-Flop 60, gates 66, 70 and 68, line 72, and two counter stages $C_2$. The input lines are coupled to the S and R inputs of the Flip-Flop and the output is taken at 28. Said comparator consists of a 2-bit reversible counter with overflow inhibition, i.e. a two-stage reversible counter in which each input is inhibited by means of gates when the counter has reached the final state which corresponds to said input. The output signal is taken from the one output of the second stage of the counter and is a pulse-width switching signal PBM whose pulse width is determined by the phase shift between the two frequencies applied thereto.

Figure 2:
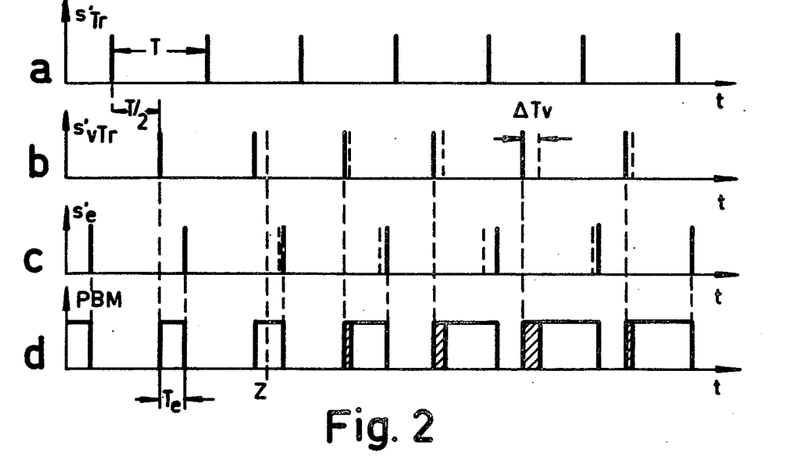
FIG. 2 shows a time diagram in explanation of the operation of the control device of FIG. 1.

This will be clarified with reference to the time diagram in FIG. 2. On the upper time axis $a$ the divided carrier pulse train $s'_{Tr}$ is represented by the triggering flanks only. The same applies to the pulse trains shown on the time axes $b$ and $c$. The divided carrier pulse train has a period T. On the time axis $b$ the carrier pulse train $s'_{vTr}$ which has been phase-shifted by pulse driving stage 17 is shown, which pulse train is shifted by a half period T/2 at the beginning when there is no control error, i.e. without the control system being disturbed. Said shift is necessary in order to be able to cope with control errors to either side. On the third time axis $c$ the output signal of the frequency divider 13 is shown, which divider supplies the frequency-divided output pulse train $s'_e$. The two pulse trains represented on the time axes $b$ and $c$ are now applied to the counter 21 which serves as a phase discriminator, one pulse train being applied to the counting input for the one counting direction and the other pulse train to the counting input for the other counting direction. As a result, the two pulse trains switch the counter between the two mean counter states so that at the output of the second counting stage the signal PBM appears, which is plotted on the time axis $d$. In the controlled condition the pulses of said signal have a width $T_e$, which is necessary for the actuation of the correction element to maintain the controlled condition.

At the instant $z$ it is assumed that the control circuit is disturbed so that the actual value of the controlled quantity deviates from the desired value. Thus, a difference arises between the frequencies $f_s$ and $f_i$ of the desired and the actual value, which inter alia gives rise to a voltage at the output of the converter 19 and thus changes the phase shift of the carrier pulse train in the pulse driver stage 17 by a time $\Delta T_v$, as is shown in FIG. 2 on the time axis $b$. Furthermore, in the mixing stage 9 said frequency difference causes an increasing phase shift of the output pulse train relative to the carrier pulse train, as is shown on the time axis $c$. As a result the pulse duration of the output signal PBM of the phase discriminator 21 increases, as is shown on the time axis $d$, the proportional component in the pulse duration being shown hatched.

Figure 3:
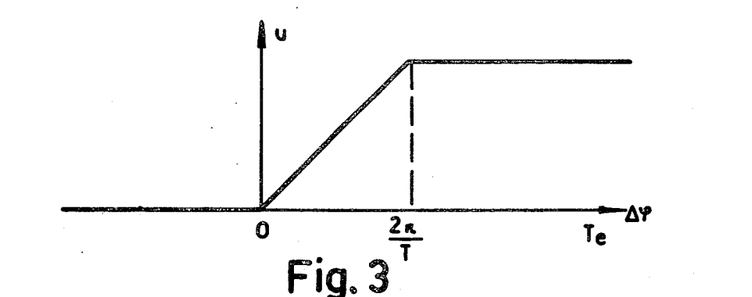
FIG. 3 shows the control characteristic of the control device of FIG. 1.

From the above description it follows that the mean value of the output signal PBM increases linearly from zero to a maximum value, when the phase difference $\Delta \varphi$ increases from zero to $2\pi$. When the phase difference becomes less than zero or exceeds the value $2\pi$, i.e. when additional pulses are obtained in the one or the other pulse train, the discriminator circuit 21 will supply the constant value zero or 1 owing to the overflow inhibition. As a result, a distinct saturation characteristic is obtained as is shown in FIG. 3.

It also follows from the above description that the frequency of the pulses in the output signal PBM equals the frequency of the divided carrier pulse train $s'_{Tr}$. Hence, said carrier pulse train $s_{Tr}$ is supplied by a variable frequency generator 11 so as to enable the frequency of the output signal PBM to be optimized with respect to prevailing conditions. When the corrective element 23 is for example a switch, the carrier pulse generator 11 may be set to a comparatively low frequency and the output signal PBM may be applied directly to the corrective element 23. In the case of a continuously operating corrective element it is more effective to employ a higher carrier pulse frequency and hence feed the output signal PBM to the corrective element via a simple low-pass filter.

It is to be noted that a variation of the frequency of the carrier pulse train neither affects the integration time of the controller, which in the case of constant dividing factors $z$ and $k$ only depends on the frequency sweep of the converter 5 which corresponds to the measuring span, nor the proportional component. It is merely necessary to accordingly adapt the phase shift which is caused by the stage 17 in the balanced condition.

Figure 4:
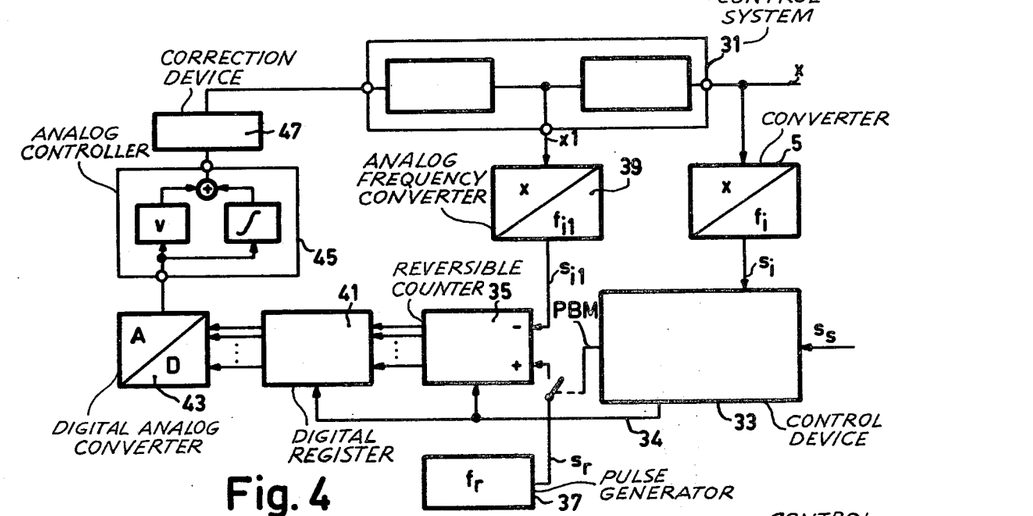
FIG. 4 shows a control device with a subordinate control loop for a further frequency-analog actual-value signal.

FIG. 4 shows a control device with a subordinate control loop. The process to be controlled is represented by a control system 31, which consists of two sub-systems. The output of the control system, i.e. the controlled quantity $x$, is again applied to a converter 5, which converts it into a pulse signal $s_i$ with a frequency $f_i$ which corresponds to the controlled quantity $x$. Said signal and the frequency-analog desired-value signal $s_s$ are applied to the control device 33, which supplies a pulse-width modulated output signal PBM and which may be as shown in FIG. 1.

Furthermore, a further controlled quantity $x_1$ is taken from an intermediate point in the control system, namely from the point between the two sub-systems, which quantity is converted in a converter 39 into a pulse-shaped actual-value signal $s_{t1}$ with a frequency $f_{t1}$ which corresponds to the controlled quantity $x_1$. Said signal is applied to the counting input for the one counting direction, in the present case for the reverse counting direction, of a counter 35, and during the pulse duration of the control signal PBM, which is thus more or less used as a reference input, a reference pulse train $s_r$ from the generator 37 is applied to the counting input for the forward direction. At the beginning of each pulse of the control signal PBM a signal on the line 34 transfers the contents of the counter 35 to the register 41 and sets the counter 35 to a selectable value.

Figure 5:
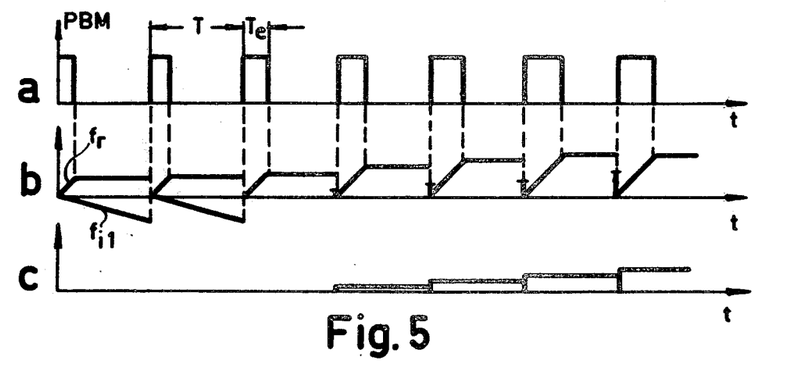
FIG. 5 is a time diagram in explanation of the operation of the control device of FIG. 4.

Said sequence of operations will be explained with reference to the time diagram of FIG. 5. On the upper time axis $a$ an example of a control voltage PBM is plotted, whose pulse durations increase continually owing to the control system 31 being disturbed. On the time axis $b$ the state of the counter 35 is plotted and for clarity this is done separately for the two counting directions. During the pulse time $T_e$ of the control signal PBM the counter 35 counts in the forward direction at a constant rate which is given by the frequency $f_r$ of the reference pulse signal $s_r$, and at the same time it counts in the negative direction with the frequency $f_{t1}$ of the further actual-value signal $s_{t1}$ during the total period T of the control PBM. In the first part of the diagram of FIG. 5, i.e. before the disturbance has any effect, the count is exactly zero when a new pulse of the control signal begins because an equal number of pulses has been counted in either direction. As the pulse width of the control signal increases the counter 35 counts for a longer time in the positive direction, so that at the end of a period T a positive count is left, which is transferred to the register 41. The lower time axis $c$ represents the contents of the register 41 in analog form, as it is for example available at the output of a following conventional D/A converter 43. Said analog signal drives a conventional analog controller 45 having a proportional and an integrating section, whose output signals are added and control the corrective element 47.

In the case of this subordinate control loop it is also effective when the additional actual value $x_1$ for zero signal-value is represented by a finite frequency $f_{t1}$ of the actual-value signal $s_{t1}$, as otherwise at zero signal-value the frequency would also become zero and the sampling theorem would be violated. Said life-zero component can be cancelled out in that the counter 35 is reset to a value which equals the product of said frequency component and the period of the control signal PBM.

Figure 6:
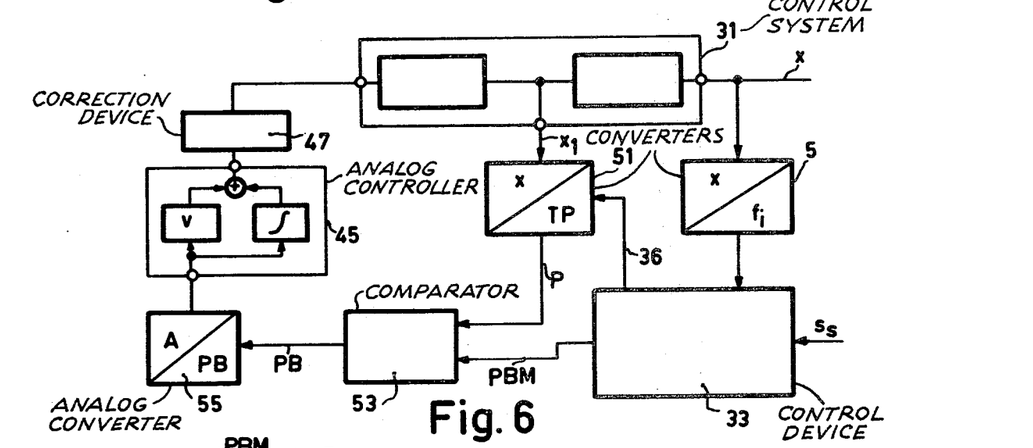
FIG. 6 shows a control device with a subordinate control loop for a pulse-width modulated further actual-value signal.

The analog conversion by the D/A converter 43 and the further processing by the analog controller 45 is only described by way of example. Instead of this, the output signal of the register 41 or counter 35 may also be processed digitally in order to drive the corrective element 47. FIG. 6 shows a different embodiment of a subordinate control loop. The actual value $x_1$ which is taken from an intermediate point of the control system 31 is now applied to a converter 51, which supplies a pulse signal P in which the duration (i.e. width) of the pulses corresponds to the magnitude of the actual-value signal $X_1$. In a comparator 53 said pulse signal P is compared with the pulse-width modulated control signal PBM, which in the control device 33 is derived from the frequency-analog control quantity $x$ supplied by the converter 5 and the frequency-analog desired-value signal $s_s$. Said control device 33 may again be of the type shown in FIG. 1.

In order to enable the pulse signal P to be directly compared with the control signal PBM, the converter 51 must be triggered via the line 36 by each pulse of the control signal. The conversion of a measuring signal into a pulse-width modulated pulse signal generally differs only slightly from the conversion into a frequency-analog pulse signal. In the last-mentioned case a capacitor, which has been charged by the measuring value, discharges when its voltage has attained a fixed, preset threshold value. In the case of pulse-width conversion the capacitor charge, which is built up by the measuring value during a time interval, is discharged in a defined manner by a trigger signal.

Pulse-width comparison of the pulse signal P and the control signal PBM is simple because the two pulses each time start at the same instants. The comparator circuit 53 may therefore be composed of a few digital components. The subsequently pulse-width modulated output signal PB of the comparator 53 is applied to an analog converter 55, which again by way of example supplies a conventional analog controller 45 having integrating and proportional circuits, whose signals are added and drive the corrective element 47.

Figure 7:
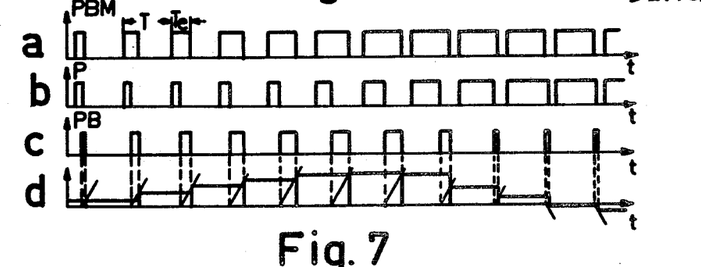
FIG. 7 shows a time diagram in explanation of the operation of the device of FIG. 6.

The operation of this arrangement is described with reference to FIG. 7. The uppermost time axis $a$ again shows an example of a control signal PBM, whose pulse duration $T_e$ increases as a result of a disturbance. On the time axis $b$ the pulse signal P is plotted, which begins simultaneously with the pulses of the control signal and whose pulse width corresponds to the further actual value $x_1$, which after a certain delay also increases. The time axis $c$ shows the output signal PB of the comparator 53, whose pulse widths equal the difference between the pulse widths of the two input signals and which therefore also increases at first and subsequently decreases. The lowest time axis $d$ shows the output signal of the analog converter 55, which converts the pulse-width modulated pulse signal PB into an analog signal through sampling by means of a saw-tooth. For this purpose a sawtooth is started at the beginning of a pulse and the amplitude value of the sawtooth, which is reached at the end of the pulse, is stored in a hold circuit. Said method eliminates the delay which arises for example when a low-pass filter is used.

What is claimed is:

1. An electrical control device for deriving a correction signal from a frequency-analog actual-value signal and a frequency-analog desired-value signal comprising, a subtractor stage, means for applying to the subtractor stage a frequency-analog actual-value signal and a desired-value signal, said subtractor stage producing at its output a differential pulse train of a frequency which equals the difference between the frequencies of the actual-value signal and the desired-value signal, an adder stage, a source of carrier pulses, means for applying the differential pulse train and the carrier pulse train to the adder stage which adds the differential pulse train to the carrier pulse train and produces an output pulse train having a frequency which is equal to the sum of the frequencies of the differential and carrier pulse trains, a 2-bit reversible counter having a counting input for the forward counting direction and a counting input for the reverse counting direction and with overflow inhibition, means for applying the output train to the counting input for one counting direction and the carrier pulse train to the counting input for the other counting direction, and means for taking the output of the second stage of the counter which supplies a control signal in pulse-width modulated form for the formation of the correction signal.

2. An electrical control device as claimed in claim 1, characterized in that the actual-value signal and the desired-value signal have the same finite frequency at zero signal value.

3. An electrical control device as claimed in claim 1 wherein said source of carrier pulses comprises a frequency generator having an adjustable frequency in accordance with the desired frequency of the control signal.

4. An electrical control device as claimed in claim 1 wherein the subtractor stage and the adder stage are combined to form a mixing stage which produces the output pulse train by pulse interpolation.

5. An electrical control device as claimed in claim 4, wherein the source of carrier pulses and the mixing stage are each followed by a frequency divider with the same dividing factor.

6. A device as claimed in claim 1 further comprising a controllable pulse driving stage responsive to the carrier pulse train and to a voltage determined by the difference between the frequencies of the actual-value signal and the derived-value signal for applying the carrier pulse train, which as the case may be has been divided, is applied via controllable pulse driving stage to the two-bit reversible counter, said controllable pulse driving stage being adapted to shift the pulses of the carrier pulse train by a time which corresponds to the difference between the frequencies of the actual-value signal and the desired-value signal.

7. An electrical control device as claimed in claim 6 further comprising a frequency-voltage converter for deriving said voltage determined by the frequency difference of the actual-value signal and the desired-value signal and wherein the pulse driving stage comprises a monostable multivibrator whose pulse width is controllable by said voltage derived from the frequency-voltage converter.

8. An electrical control device as claimed in claim 7, characterized in that the frequency-voltage converter operates in accordance with the pulse averaging principle.

9. An electrical control device as claimed in claim 7, characterized in that the frequency-voltage converter operates in accordance with the pulse-spacing measurement principle and includes a sampling and hold circuit.

10. An electrical control device as claimed in claim 1 wherein the subtractor stage receives the actual-value signal and the desired-value signal each via an adjustable frequency divider having the same dividing factor for adjusting the integrating component in the correction signal.

11. An electrical control device as claimed in claim 1 further comprising a low-pass filter responsive to the control signal to obtain a quasi-continuous correction signal.

12. An electrical control device as claimed in claim 1 wherein a further frequency-analog actual-value signal is obtained from an intermediate point of a control system, the control device further comprising a further reversible counter, a source of reference pulses, means controlled by said pulse-width modulated control signal for coupling, during the duration of each pulse of the pulse-width modulated control signal said reference pulse train to the input for the one counting direction of the further reversible counter, means for coupling the further actual-value signal to the input for the other counting direction of the further reversible counter, means responsive to each pulse of the pulse-width modulated control signal for storing the contents of the further reversible counter, the further reversible counter being set to a selectable valve, and a controller responsive to the stored counter contents for generating the correction signal.

13. An electrical control device as claimed in claim 12, characterized in that the further actual-value signal is represented by a finite frequency at zero signal-value and that the selectable value to which the further reversible counter can be reset at the beginning of each pulse of the control signal equals the product of said finite frequency and the period of the pulse-width modulated control signal.

14. An electrical control device as claimed in claim 12 wherein said storing means comprises a digital register.

15. An electrical control device as claimed in claim 14, wherein said controller includes a digital-analog converter connected to the output of the digital register.

16. An electrical control device as claimed in claim 14, characterized in that a digital controller is connected to the output of the digital register.

17. An electrical control device as claimed in claim 1 wherein a further analog actual-value signal is available from a control system controlled by the electrical control device, the control device further comprising an analog converter responsive to the further analog actual-value signal and upon each pulse of the pulse-width modulated control signal supplying an actual-value pulse whose pulse-width corresponds to the actual-value signal, a comparator stage for comparing the pulse duration of the actual-value pulses and the pulses of the pulse-width modulated control signal to produce a pulse train in which the width of the pulses equals the difference between the input pulse widths, and a controller responsive to the output pulses of the comparator stage for generating the correction signal.

18. An electrical control device for deriving a correction signal for a controlled system comprising, means for generating a first reference pulse train having a frequency related to a desired value of a system parameter, means responsive to the controlled system for producing a second pulse train whose frequency is determined by the actual value of the system parameter, means for generating a third reference carrier pulse train, a mixer stage responsive to said first, second and third pulse trains and including means for subtracting the first and second pulse trains to produce a differential pulse train of the difference frequency of said first and second pulse trains and means for adding the differential pulse train to the third pulse train to produce a fourth pulse train whose frequency is the sum of the differential pulse train and the third reference carrier pulse train, a two-bit reversible counter having forward and reverse counting input terminals, first means for coupling said fourth pulse train to one counting input terminal of the counter, second means for coupling said third carrier pulse train to the other counting input terminal of the counter, said reversible counter being responsive to said third and fourth pulse trains to produce at its output a control pulse train whose pulses are pulse-width modulated as a function of the phase shift between the third and fourth pulse trains applied thereto.

19. An electric control device as claimed in claim 18 wherein said second coupling means includes a pulse control stage responsive to the third pulse train and including means for shifting the carrier pulses in time as a function of the frequency difference of said first and second pulse trains.

20. An electric control device as claimed in claim 19 wherein said pulse control stage comprises a monostable multi-vibrator having means for varying the pulse width of its output pulses as a function of an input voltage, means responsive to said first and second pulse trains for deriving a control voltage determined by the frequency difference of said first and second pulse trains, and means for applying said control voltage to said monostable multivibrator so as to control the pulse width of the multivibrator output pulses.

21. An electric control device as claimed in claim 18 further comprising, second means responsive to the controlled system for producing a fifth pulse train whose frequency is determined by the actual value of a further system parameter, a second reversible counter having one counting input coupled to receive said fifth pulse train, a further source of reference pulses, means controlled by said control pulse train for selectively coupling said further source of reference pulses to a second counting input of the second reversible counter, and controller means responsive to the output of the second reversible counter for producing a correction signal for the controlled system.

22. An electric control device as claimed in claim 21 wherein said controller means comprises, a digital register connected to the output of the second reversible counter, and a digital-analog converter coupled to the output of the digital register.

23. An electric control device as claimed in claim 19 further comprising, a second means responsive to the controlled system for producing a fifth pulse train whose frequency is determined by the actual value of a further system parameter, a second reversible counter having one counting input coupled to receive said fifth pulse train, a further source of reference pulses, means controlled by said control pulse train for selectively coupling said further source of reference pulses to a second counting input of the second reversible counter, and controller means responsive to the output of the second reversible counter for producing a correction signal for the controlled system.

24. An electric control device as claimed in claim 18 further comprising, a second means responsive to the controlled system for producing a fifth pulse train the width of whose pulses is determined by a further system parameter, a comparator having first and second inputs coupled to receive respectively said fifth pulse train and the pulse-width modulated control pulse train to produce an output train the width of whose pulses is determined by the widths of the pulse trains received at said first and second inputs, and controller means responsive to the output of the comaparator for producing a correction signal for the controlled system.

25. An electric control device as claimed in claim 19 further comprising, second means responsive to the controlled system for producing a fifth pulse train the width of whose pulses is determined by a further system parameter, a comparator having first and second inputs coupled to receive respectively said fifth pulse train and the pulse-width modulated control pulse train to produce an output train the width of whose pulses is determined by the widths of the pulse trains received at said first and second inputs, said controller means responsive to the output of the comparator for producing a correction signal for the controlled system.

* * * * *

UNITED STATES PATENT OFFICE
CERTIFICATE OF CORRECTION

Patent No. 4,007,363  Dated February 8, 1977

Inventor(s) Jürgen Lemmrich

It is certified that error appears in the above-identified patent and that said Letters Patent are hereby corrected as shown below:

Column 4, line 49, "quantity" should read -- quantity x --.

Signed and Sealed this

Seventh Day of November 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO.   : 4,007,363
DATED        : February 8, 1977
INVENTOR(S)  : JÜRGEN LEMMRICH It is certified that error appears in the above-identified patent and that said Letters Patent are hereby corrected as shown below:

IN THE ABSTRACT line  1,  "The" should be deleted, and it should read "An electric control device wherein the--; after "desired" it should read --value--;

line 12,  "comparison" should read --two-bit reversible--;

line 20,  "other signal" should read --pulse-width modulated output pulse train--;

Signed and Sealed this

Third Day of July 1979

[SEAL]

Attest:

Attesting Officer

LUTRELLE F. PARKER
Acting Commissioner of Patents and Trademarks